A. N. WOODS.
REVERSING GEAR.
APPLICATION FILED JAN. 20, 1908.
913,445.
Patented Feb. 23, 1909.
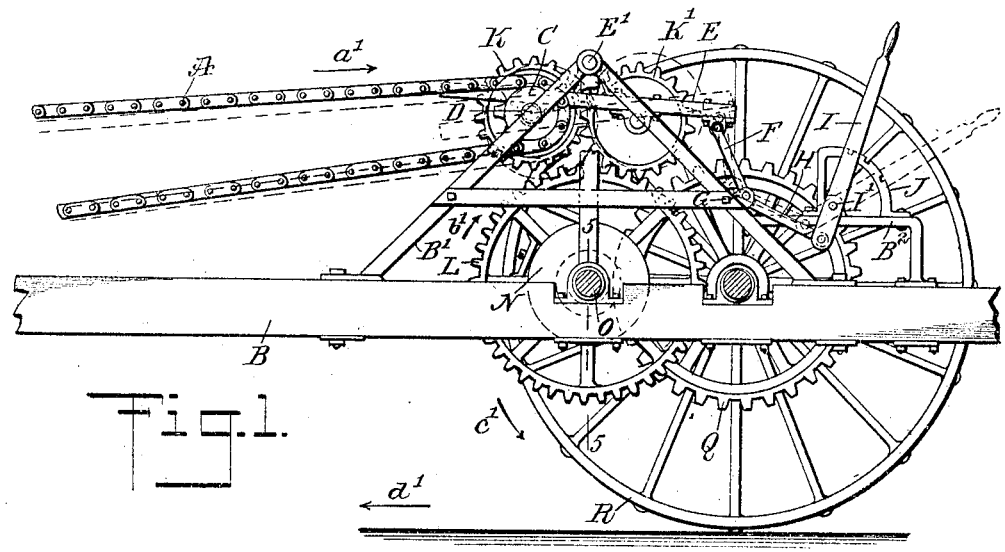
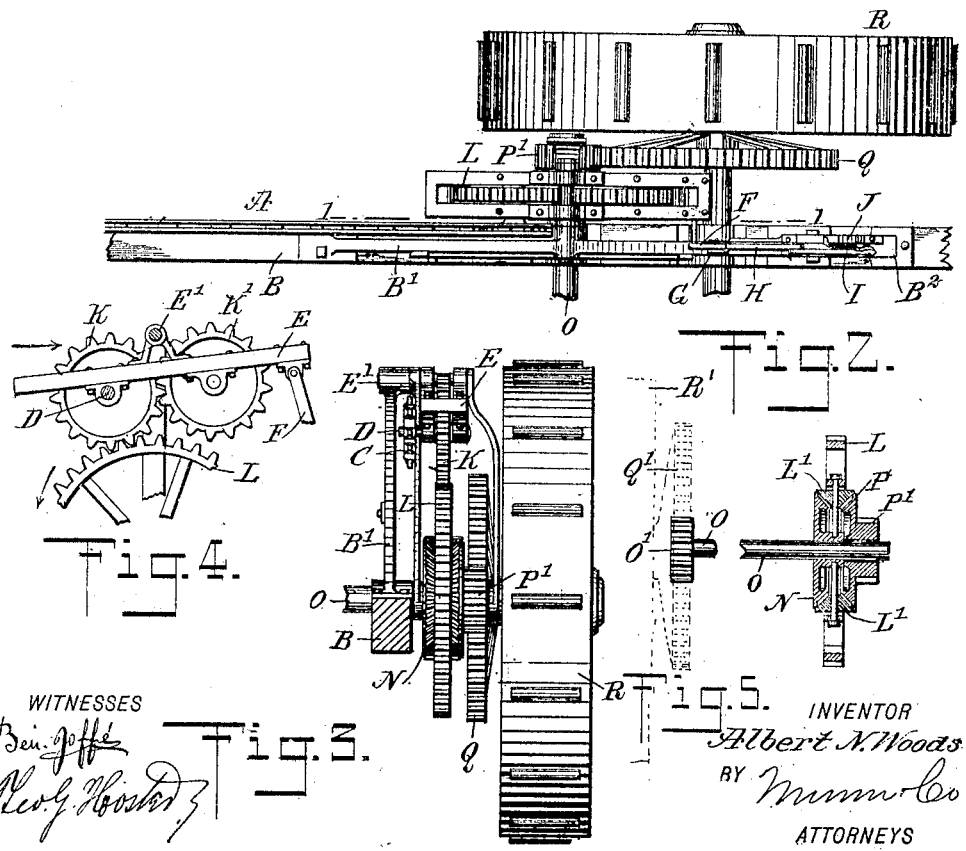
WITNESSES
INVENTOR
Albert N. Woods
BY Munn & Co
ATTORNEYS

UNITED STATES PATENT OFFICE.

ALBERT N. WOODS, OF CORVALLIS, OREGON.

REVERSING-GEAR.

No. 913,445.   Specification of Letters Patent.   Patented Feb. 23, 1909.

Application filed January 20, 1908. Serial No. 411,626.

*To all whom it may concern:*

Be it known that I, ALBERT N. WOODS, a citizen of the United States, and a resident of Corvallis, in the county of Benton and State of Oregon, have invented a new and Improved Reversing-Gear, of which the following is a full, clear, and exact description.

The object of the invention is to provide a new and improved reversing gear for traction engines and other power vehicles, and arranged to permit convenient and quick reversing for driving the vehicle in the desired direction.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a sectional side elevation of part of a motor vehicle, provided with the improvement, the section being on the line 1—1 of Fig. 2; Fig. 2 is a plan view of the same; Fig. 3 is a cross section of the same; Fig. 4 is a side elevation of part of the reversing gear, and Fig. 5 is a transverse section of the improvement on the line 5—5 of Fig. 1.

The sprocket chain A is driven from an engine or other motor mounted on the frame B of the vehicle, and the said sprocket chain A passes over a sprocket wheel C, secured on a transversely-extending shaft D, journaled in suitable bearings, held on a lever E, fulcrumed at E' on a bracket B' attached to the main frame B of the vehicle. The lever E is pivotally connected by a link F with a slide G, mounted to slide on the bracket B' and pivotally connected by a link H with a hand lever I under the control of the operator, and fulcrumed at I' on a bracket B², attached to the main frame B. The hand lever I is adapted to be locked to a quadrant J. so as to hold the lever E in a desired position, as hereinafter more fully explained.

On the shaft D is secured a pinion K in mesh with a pinion K' journaled on the lever E, in such a manner that the two pinions K and K' are located on opposite sides of the fulcrum E' of the lever E (see Fig. 4). Either of the pinions K, K' is adapted to be moved in mesh with a compensating gear wheel L, on imparting a corresponding swinging motion to the lever E, by manipulating the lever I; that is, when the lever I is in the position shown in Fig. 1, the pinion K' is in mesh with the gear wheel L, while the pinion K is out of mesh with the said gear wheel L, and when the lever I is shifted, to swing the lever E into the position shown in Fig. 4, then the pinion K' is out of mesh with the gear wheel L, and the pinion K is in mesh with the said gear wheel.

It is expressly understood that no matter what position the lever E may take as described, the pinions K and K' are in mesh with each other and are rotated simultaneously whenever a traveling motion is given to the sprocket chain A by the motor of the vehicle.

The compensating gear wheel L is mounted to rotate loosely on the hub of a bevel gear wheel N, secured on a shaft O, journaled in suitable bearings on the frame B, and extending transversely thereon. On the web of the gear wheel L are journaled beveled pinions L' in mesh with the bevel gear wheel N above mentioned, and also in mesh with a bevel gear wheel P, mounted to rotate loosely on the shaft O. The bevel gear wheels N and P are located on opposite sides of the gear wheel L, and the bevel gear wheel P is provided with a pinion P', in mesh with a gear wheel Q, attached to one of the traction wheels R, the other traction wheel R', having a similar gear wheel Q' in mesh with a pinion O' similar to the pinion P' and secured on the shaft O.

When the several parts are in the position illustrated in Fig. 1 and a traveling motion is given by the motor to the sprocket chain A, then the pinions K and K' are driven, and as the pinion K' is in mesh with the gear wheel L, the latter is rotated in the direction of the arrow b', whereby a rotary motion is transmitted to the traction wheels R, R' in the direction of the arrow c', to propel the vehicle forward in the direction of the arrow d'.

When the lever E is shifted by the operator manipulating the lever I, to the position shown in Fig. 4, then the gear wheel L is turned in the opposite direction of the arrow b', to cause the rotation of the traction wheels R, R' in the opposite direction of the arrow c', to propel the vehicle backward, that is, in the opposite direction of the arrow d'.

From the foregoing it will be seen that the operator by simply manipulating the hand lever I, can conveniently reverse the travel of the vehicle without stopping or reversing the motor.

The compensating gearing described, and consisting essentially of the bevel gear wheels N, P, permits the traction wheels R, R' to turn at differential speed when going around a curve or the like.

By the arrangement described, the draft of the traction wheels is equalized, to allow each traction wheel to turn a short curve with equal power. The device may be used for other purposes.

The device is very simple, durable in construction and composed of comparatively few parts, not liable easily to get out of order.

Having thus described my invention, I claim as new and desire to secure by Letters Patent:

1. A reversing gear for traction engines and other power vehicles, comprising a lever, pinions journaled on the said lever one at each side of its pivot and in mesh with each other, one of the pinions being driven, a compensating gear wheel adapted to be engaged by either of the said pinions, the said gear wheel being geared with the traction wheels, a link connected with one end of the said lever, a slide connected with the said link, a hand lever, and a link connecting the said hand lever with the said slide.

2. A reversing gear for traction engines and other power vehicles, comprising a lever, pinions journaled on the said lever one at each side of its pivot and in mesh with each other, one of the pinions being driven, a compensating gear wheel adapted to be engaged by either of the said pinions, the said gear wheel being geared with the traction wheels, a link connected with one end of the said lever, a slide connected with the said link, a hand lever, a link connecting the said hand lever with the said slide, and a quadrant for engagement by the said hand lever to lock the latter in place.

3. In a reversing gear for traction engines and other vehicles, a frame, traction wheels mounted in the frame, a bracket carried by the frame, a lever pivoted to the bracket, pinions mounted on the lever one at each side of its pivot and meshing with each other, means for operating one of said pinions, a slide mounted on the bracket, a link connecting the slide with one end of the lever, an operating lever, a link connecting the operating lever with the slide, a gear wheel with which the pinions are adapted to alternately engage, and means for operating the traction wheels from said gear wheel.

In testimony whereof I have signed my name to this specification in the presence of two subscribing witnesses.

ALBERT N. WOODS.

Witnesses:
E. D. HORGON,
B. M. THORP.